United States Patent
Chen et al.

(10) Patent No.: US 12,015,760 B2
(45) Date of Patent: Jun. 18, 2024

(54) VIDEO CODING FOR HANDLING DIFFERENT PICTURE SIZES

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 295 days.

(21) Appl. No.: 17/468,450

(22) Filed: Sep. 7, 2021

(65) Prior Publication Data

US 2022/0030219 A1     Jan. 27, 2022

Related U.S. Application Data

(63) Continuation of application No. PCT/US2020/021030, filed on Mar. 4, 2020.
(Continued)

(51) Int. Cl.
*H04N 19/103* (2014.01)
*H04N 19/172* (2014.01)

(52) U.S. Cl.
CPC ......... *H04N 19/103* (2014.11); *H04N 19/172* (2014.11)

(58) Field of Classification Search
CPC .... H04N 19/103; H04N 19/172; H04N 19/96; H04N 19/119; H04N 19/176
See application file for complete search history.

(56) References Cited

U.S. PATENT DOCUMENTS

| 2013/0308707 A1 | 11/2013 | Raveendran et al. |
| 2014/0254667 A1 | 9/2014 | Rapaka et al. |

(Continued)

FOREIGN PATENT DOCUMENTS

| KR | 10-20150133681 A | 11/2015 |
| WO | 2017162912 A1 | 9/2017 |

OTHER PUBLICATIONS

International Search Report of International Application No. PCT/US2020/021030 dated Jun. 24, 2020, (2p).
(Continued)

*Primary Examiner* — Boubacar Abdou Tchoussou
(74) *Attorney, Agent, or Firm* — Arch & Lake LLP

(57) ABSTRACT

Provided is a video coding method comprising that the width of a video picture is set to be a first multiple of a first number M, and the first number M is a positive integer. The height of the picture is set to be a second multiple of a second number N, and the second number N is a positive integer. The first number M and the second number N are predetermined. Additionally, it is determined that a merge sharing node is located outside of the picture. The merge sharing node is corresponding to a first region of the picture, a first set of coding units of the picture are within the first region, and the first set of coding units are coded with a merge mode. A constraint process is then applied such that the boundary of the merge sharing node is aligned with the boundary of the picture.

7 Claims, 10 Drawing Sheets

Related U.S. Application Data

(60) Provisional application No. 62/816,034, filed on Mar. 8, 2019.

(56) References Cited

U.S. PATENT DOCUMENTS

| | | | |
|---|---|---|---|
| 2015/0016540 A1 | 1/2015 | Rapaka et al. | |
| 2015/0304667 A1 | 10/2015 | Suehring et al. | |
| 2020/0236376 A1* | 7/2020 | Li | H04N 19/176 |

OTHER PUBLICATIONS

Extended European Search Report issued in Application No. 20770680.5, dated Dec. 2, 2022,(10p).

Supplementary European Search Report issued in Application No. 20770680.5, dated Dec. 22, 2022,(1p).

MediaTek Inc.,"CE4-related: Shared merge list", Joint Video Experts Team (JVET) of ITU-TSG 16 WP3 and ISO/IEC JTC 1/SC29/WG 11, 12th Meeting: Macao, CN, Oct. 3-12, 2018, JVET-L0091-v2, (4p).

Kwai Inc.,"Non-CE4: Shared Merge List on the Constraints of Picture Sizes", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0476, (4p).

Benjamin Bross, "Versatile Video Coding (Draft 4)", Joint Video Experts Team (JVET) of ITU-T SG 16 WP 3 and ISO/IEC JTC 1/SC 29AVG 11, 13th Meeting: Marrakech, MA, Jan. 9-18, 2019, JVET-M1001-v54, (p287).

Samsung Electronics Co., Ltd.."Removal of input picture size constraint and picture cropping off setparameters in sequence parameter set", Joint Collaborative Team on Video Coding(JCT-VC) of ITU-T SG 16 WP 3 and ISO/IEC JTC 1/SC 29/WG 11, 9th Meeting: Geneva,CH,Apr. 27-May 7, 2012, JCTVC-I0144, (8p).

* cited by examiner

VIDEO CODING FOR HANDLING DIFFERENT PICTURE SIZES

CROSS-REFERENCE TO RELATED APPLICATIONS

This application is a continuation application of PCT application No. PCT/US2020/021030 filed on Mar. 4, 2020, which claims the benefit of U.S. Provisional Application No. 62/816,034 filed on Mar. 8, 2019, the entire disclosures of which are incorporated herein by reference in their entireties.

FIELD

The present disclosure relates generally to coding (e.g., encoding and decoding) video data. More specifically, this disclosure relates to a video coding method, a computing device, and a non-transitory computer readable storage medium for handling different picture sizes.

BACKGROUND

This section provides background information related to the present disclosure. The information contained within this section should not necessarily be construed as prior art.

Various video coding techniques may be used to compress video data. Video coding is performed according to one or more video coding standards. For example, video coding standards include versatile video coding (VVC), joint exploration test model coding (JEM), high-efficiency video coding (H.265/HEVC), advanced video coding (H.264/AVC), moving picture experts group coding (MPEG), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (WET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, ITU-T and ISO/IEC issued a joint call for proposals (CfP) on video compression with capability beyond HEVC. In April 2018, 23 CfP responses were received and evaluated at the 10-th JVET meeting, which demonstrated compression efficiency gain over the HEVC of around 40%. Based on such evaluation results, the JVET launched a new project to develop the new generation video coding standard named Versatile Video Coding (VVC). In the same month, one reference software codebase, called VVC test model (VTM), was established for demonstrating a reference implementation of VVC standard.

SUMMARY

This section provides a general summary of the disclosure, and is not a comprehensive disclosure of its full scope or all of its features.

According to a first aspect of the present disclosure, a video coding method is provided. The video coding method comprises: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

According to a second aspect of the present disclosure, a computer device is provided. The computer device comprises one or more processors, a non-transitory storage coupled to the one or more processors, and a plurality of programs stored in the non-transitory storage that, when executed by the one or more processors, cause the computing device to perform acts comprising: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

According to a third aspect of the present disclosure, a non-transitory computer readable storage medium is provided. The non-transitory computer readable storage medium stores a plurality of programs for execution by a computing device having one or more processors, wherein the plurality of programs, when executed by the one or more processors, cause the computing device to perform acts comprising: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

BRIEF DESCRIPTION OF THE DRAWINGS

Hereinafter, sets of illustrative, non-limiting examples of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different examples may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one example," "an example," "another example," or the like in the singular or plural means that one or more particular features, structures, or characteristics described in connection with an example are included in at least one example of the present disclosure. Thus, the appearances of the phrases "in one example" or "in an example," "in another example," or the like in the singular or plural in various places throughout this specification are not necessarily all referring to the same example. Furthermore, the particular features, structures, or characteristics in one or more examples may be combined in any suitable manner.

The present disclosure relates generally to coding (e.g., encoding and decoding) video data. More specifically, this disclosure relates to a video coding method, a computing device, and a non-transitory computer readable storage medium for handling different picture sizes.

Figure 1:
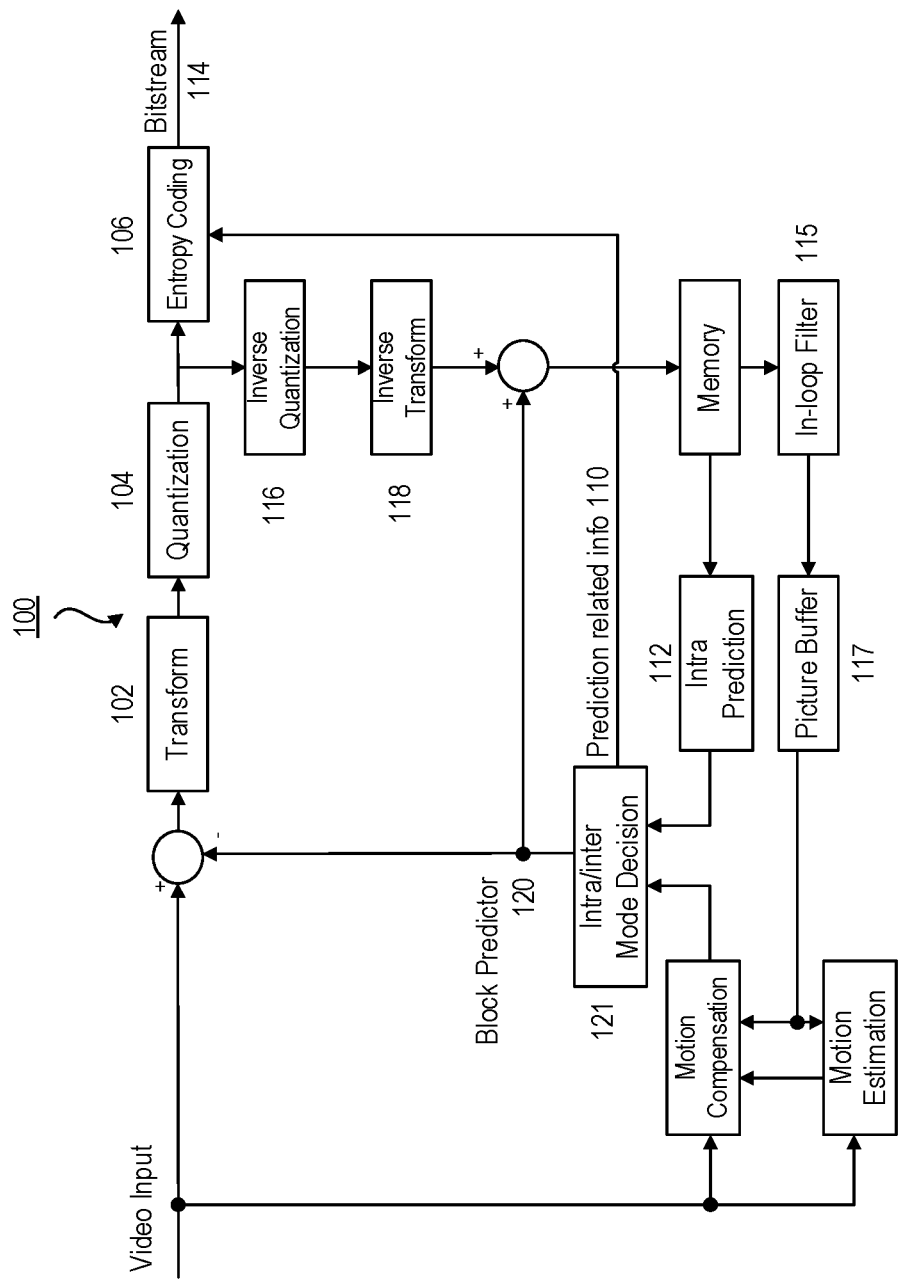
FIG. 1 is a block diagram setting forth an illustrative block-based video encoder which may be used in conjunction with many video coding standards including VVC.

Like HEVC, VVC is built upon the block-based hybrid video coding framework. FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

FIG. 1 is a block diagram setting forth an illustrative block-based video encoder which may be used in conjunction with many video coding standards including VVC. In the encoder 100, a video frame is partitioned into a plurality of blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a transform circuitry 102. The term "circuitry" as used herein includes hardware and software to operate the hardware. Transform coefficients are then sent from the transform circuitry 102 to a quantization circuitry 104 for entropy reduction. Quantized coefficients are then fed to an entropy coding circuitry 106 to generate a compressed video bitstream. As shown in FIG. 1, prediction-related information 110 from an inter prediction circuitry and/or an intra prediction circuitry 112, such as block partition info, motion vectors, reference picture index, and intra prediction mode, etc., are also fed through the entropy coding circuitry 106 and saved into a compressed video bitstream 114.

In the encoder 100, decoder-related circuitries are also needed in order to reconstruct pixels for the purpose of prediction. First, a prediction residual is reconstructed through an inverse quantization circuitry 116 and an inverse transform circuitry 118. This reconstructed prediction residual is combined with a block predictor 120 to generate un-filtered reconstructed pixels for a current block.

As shown in FIG. 1, intra prediction (also referred to as "spatial prediction") and/or inter prediction (also referred to as "temporal prediction" or "motion compensated prediction") may be performed. Intra prediction uses pixels from the samples of already coded neighboring blocks (which are called reference samples) in the same video picture or slice to predict the current video block. Intra prediction reduces spatial redundancy inherent in the video signal. Inter prediction uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference.

Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in an encoder 100 chooses a best prediction mode, for example based on the rate-distortion optimization method. A prediction block is then subtracted from the current video block; and a prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding circuitry 106 to be further compressed and packed to form the bit-stream.

Figure 2:
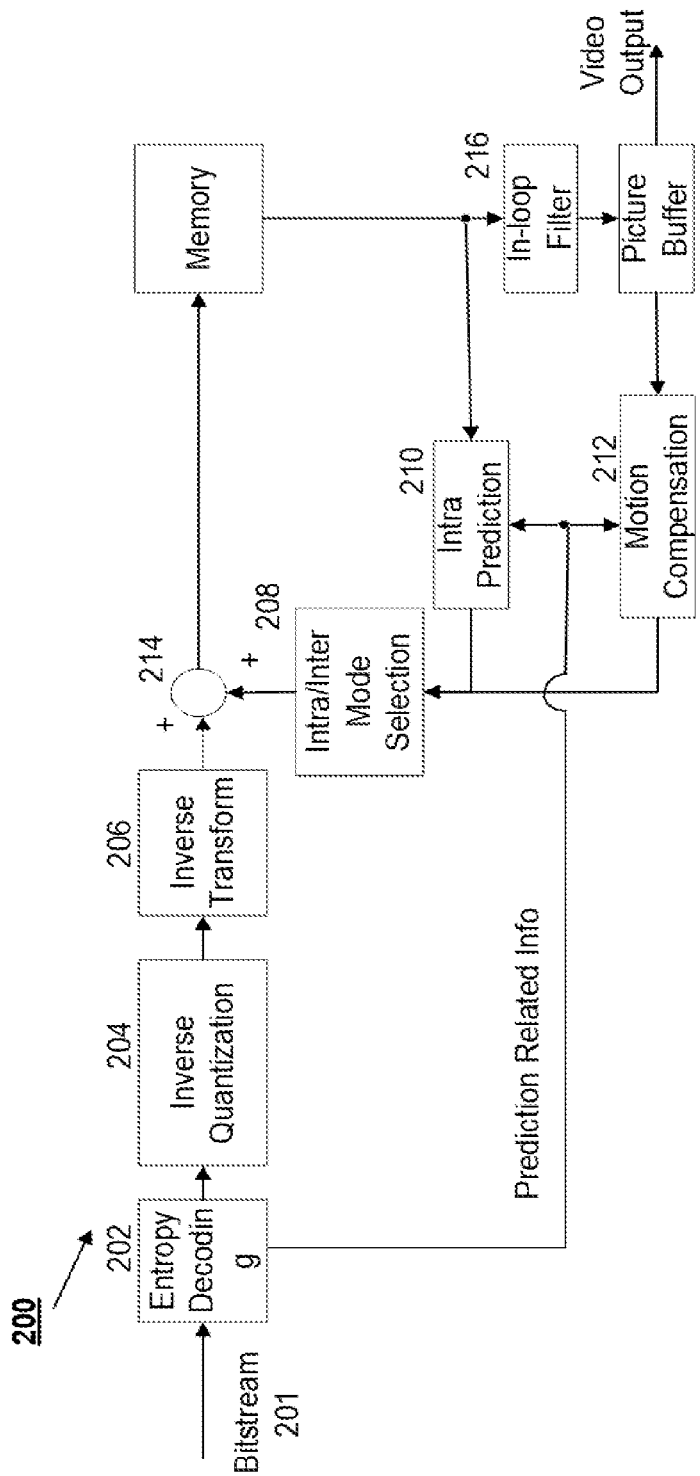
FIG. 2 is a block diagram setting forth an illustrative block-based video decoder which may be used in conjunction with many video coding standards including VVC.

FIG. 2 is a block diagram setting forth an illustrative block-based video decoder which may be used in conjunction with many video coding standards including VVC. In some examples, decoder 200 is similar to the reconstruction-related section residing in encoder 100 of FIG. 1. A video bit-stream is first entropy decoded at an entropy decoding circuitry 202. A coding mode and prediction information are sent to either a spatial prediction circuitry (if intra coded) or a temporal prediction circuitry (if inter coded) to form a prediction block. Residual transform coefficients are sent to an inverse quantization circuitry 204 and an inverse transform circuitry 206 to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

Figure 3A:
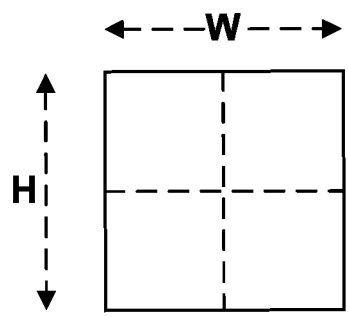
FIGS. 3A-3E show example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E), according to some examples.
Figure 3B:
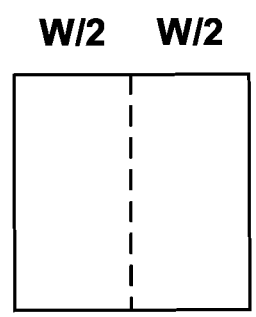
Figure 3C:
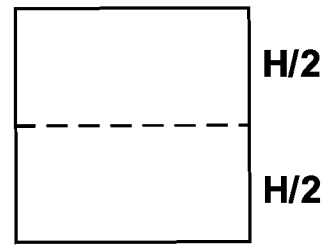
Figure 3D:
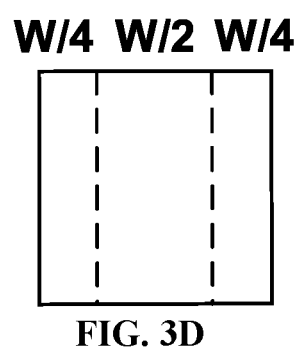
Figure 3E:
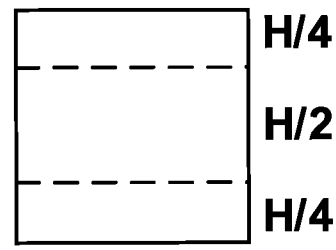

FIGS. 3A-3E show five example splitting types, namely, quaternary partitioning (FIG. 3A), horizontal binary partitioning (FIG. 3B), vertical binary partitioning (FIG. 3C), horizontal ternary partitioning (FIG. 3D), and vertical ternary partitioning (FIG. 3E).

In some examples, the basic intra prediction scheme applied in VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation. The main focus of the disclosure is to improve the existing ISP design in VVC standard. However, in the following, other coding tools (e.g., the tools in the intra prediction and transform coding) that are included in VVC and closely related to the proposed techniques in the disclosure are briefly reviewed.

In some examples, a video frame or picture may be partitioned into one or more coding tree units (CTUs). Each CTU may be partitioned into one or more CUs, that are, leaf nodes to adapt to varying local characteristics based on quad/binary/ternary-tree.

There is a constraint to share a same merging candidate list for all leaf CUs of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

The merge sharing node will be decided for each CU inside a CTU during parsing stage of decoding. Moreover, the merge sharing node is an ancestor node of leaf CUs which must satisfy the following 2 criteria: (1) the merge sharing node size is equal to or larger than a size threshold, and (2) in the merge sharing node, one of the child CU size is smaller than the size threshold.

Moreover, it has to be guaranteed that no samples of the merge sharing node are outside the picture boundary. During parsing stage, if an ancestor node satisfies the criteria (1) and (2) above but has some samples outside the picture boundary, this ancestor node will not be the merge sharing node and the decoder proceeds to find the merge sharing node for its child CUs.

The shared merging candidate list algorithm supports translational merge (including non-subblock merge mode and triangle merge mode, history-based candidate is also supported) and subblock-based merge mode. For all kinds of merge mode, the behavior of shared merging candidate list algorithm looks basically the same, and it just generates candidates at the merge sharing node pretending the merge sharing node is a leaf CU. It has two major benefits. The first benefit is to enable parallel processing for merge mode, and the second benefit is to share computations in generating the merging candidate list for all leaf CUs under the merge sharing node. Therefore, it significantly reduces the implementation cost of all merge modes for hardware codec. With the shared merging candidate list, the encoder and decoder can easily support parallel encoding for merge mode, and it alleviates the cycle budget problem of merge mode.

In some examples, the syntax for picture width and picture height is restricted that the picture width and height values have to be multiples of the minimum CU width and/or height which is defined as 4 in current VVC. If a picture's width or height value does not satisfy the constraint, the picture has to be padded so that its padded width and height values satisfy the constraint.

Figure 4:
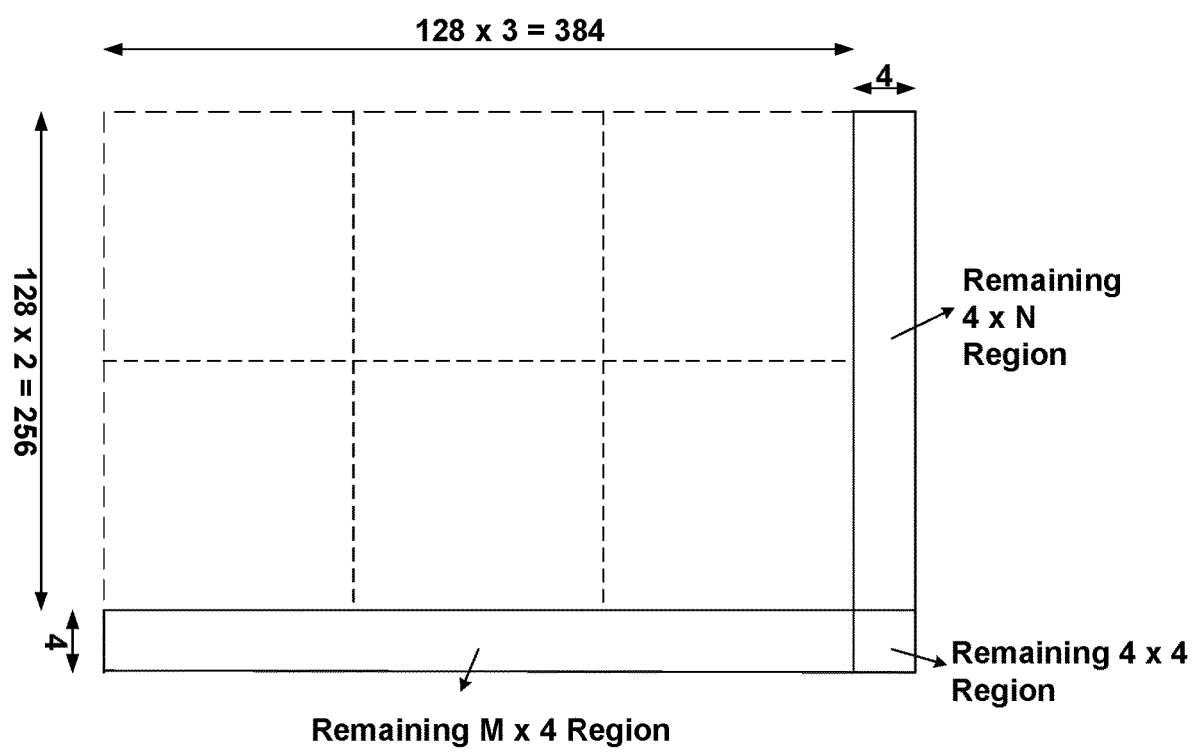
FIG. 4 shows a picture of size 388×260 having remaining regions of size 4×N, M×4, or 4×4.

The constraints that picture width and height have to be multiples of the minimum CU width or height (which is 4 in current VVC) may cause some problems when some coding tools are enabled. FIG. 4 shows a picture of size 388×260 having remaining regions of size 4×N, M×4, or 4×4. As shown in FIG. 4, when coding a picture of 388×260 resolution, the remaining region has either width or height equal to 4 in the right and bottom areas of the picture. Such a picture resolution may cause some issues for certain VVC coding tools such as share merge list.

Figure 5:
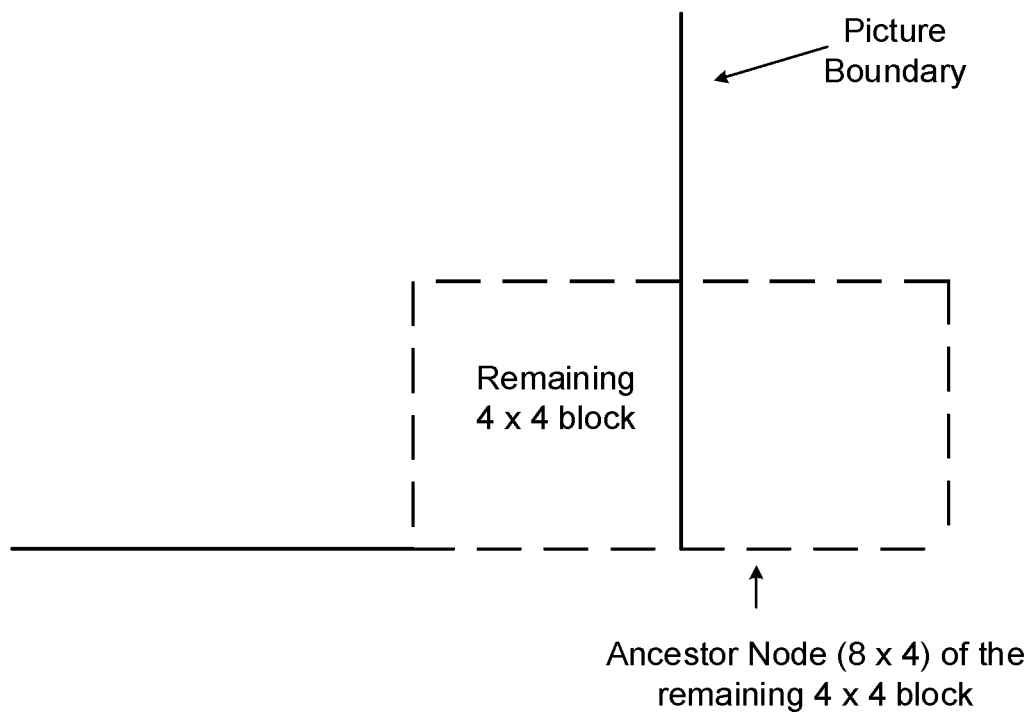
FIG. 5 shows a picture illustrating that a merge sharing node for a remaining 4×4 block has region located outside of the picture.

FIG. 5 shows a picture illustrating that a merge sharing node for a remaining 4×4 block has region located outside of the picture. As shown in FIG. 5, regarding the shared merge list, the merge sharing node of the remaining 4×4 block located at the bottom-right corner of the picture may have region located outside the picture boundary, which may result in undefined operations for motion vector predictor (MVP) derivation.

Figure 6:
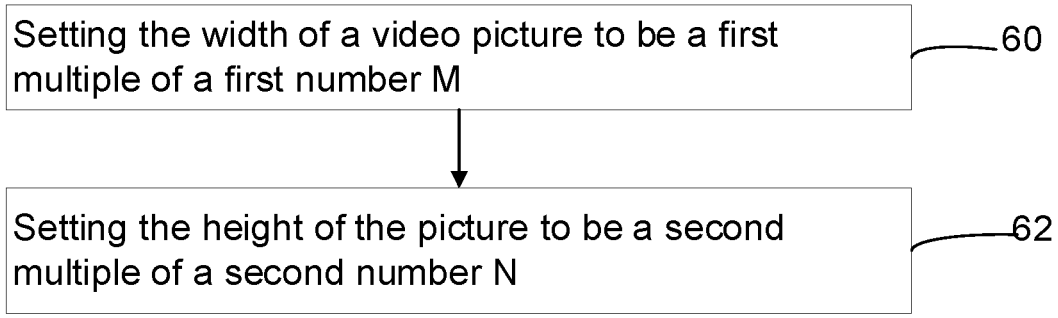
FIG. 6 is a flowchart illustrating an exemplary operation of a video coder.

FIG. 6 is a flowchart illustrating an exemplary operation of a video coder, such as video encoder 100 shown in the example of FIG. 1 and/or video decoder 200 shown in the example of FIG. 2. At step 60, the width of the picture is set to be a first multiple of a first number M, and at step 62, the height of the picture is set to be a second multiple of a second number N. The first number M and the second number N are positive integer. The two numbers may be identical or different than each other. The first number M and the second number N are predetermined numbers.

In some examples, the picture width and picture height are both constrained to be multiples of a predefined size which is not necessarily equal to the minimum CU width and/or height. For example, the width of the picture is set to be a first multiple of a first number M, and the first number M is a positive integer. The height of the picture is set to be a second multiple of a second number N, and the second number N is a positive integer. The first number M and the second number N are predetermined.

In some examples, instead of using a value of 4 as currently defined in VVC, the predefined size can be chosen as 8 instead. If a picture's width or height value is not multiple of such predefined size, the picture has to be padded so that its padded width and height values are both multiple of the predefined size.

In some examples, the picture width is constrained to be multiples of a predefined size and the picture height is constrained to be multiples of a different predefined size. If a picture's width or height value does not satisfy the constraint, the picture has to be padded so that its width and height values satisfy the corresponding constraint respectively. In one example, width has to be multiple of 8 and height has to be multiple of 4. In another example, width has to be multiple of 4 and height has to be multiple of 8. In another example, width has to be multiple of 8 and height has to be multiple of 8.

In some examples, the sizes of picture width and height are constrained according to the minimum size of a merge sharing node. Assuming the minimum size of a merge sharing node is A×B pixels, then, picture width has to be multiple of value A and picture height has to be multiple of value B, or picture width has to be multiple of value B and picture height has to be multiple of value A.

Figure 7:
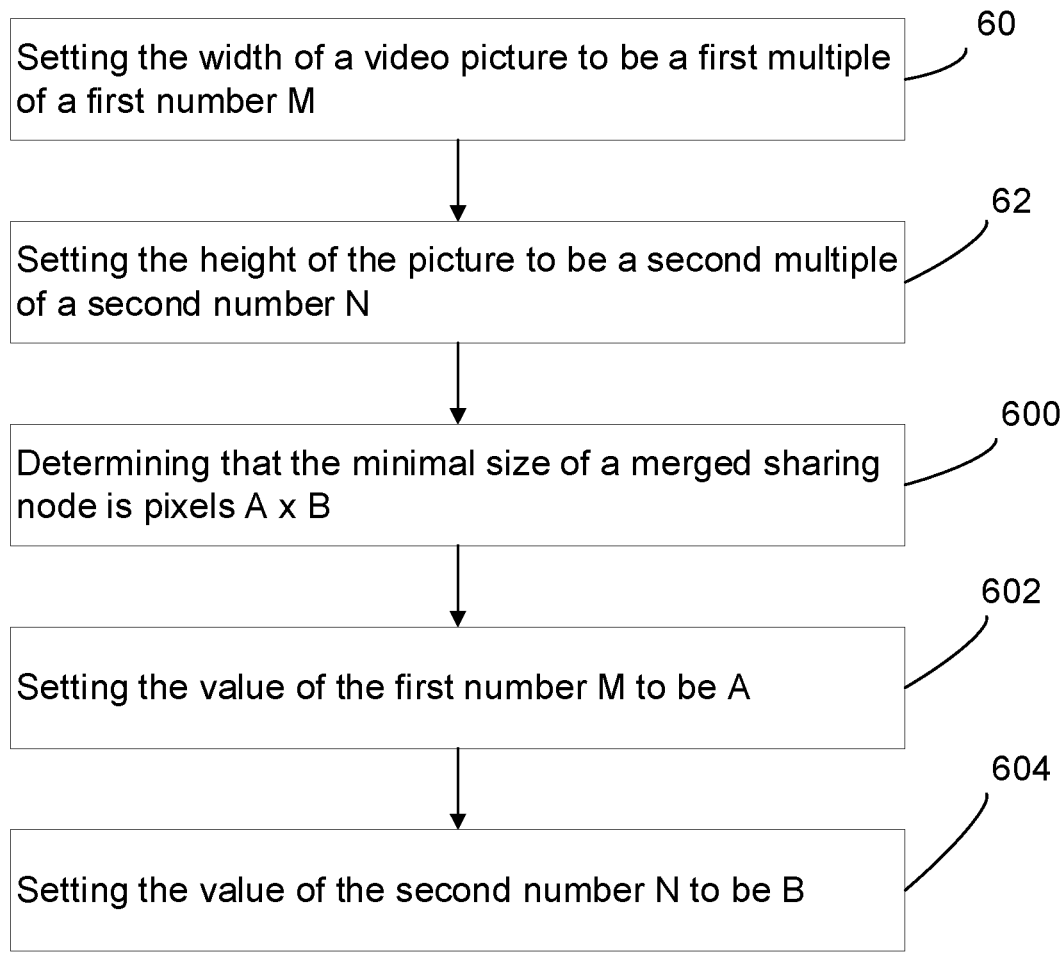
FIG. 7 is a flowchart illustrating another exemplary operation of a video coder.

FIG. 7 is a flowchart illustrating another exemplary operation of a video coder, such as video encoder 100 shown in the example of FIG. 1 and/or video decoder 200 shown in the example of FIG. 2. In addition to steps 60 and 62, at step 600, it is then determined that the minimum size of a merged sharing node is A×B pixels, wherein A and B are positive integers. The merge sharing node may be corresponding to a first region of the picture. There may be a first set of coding units (CTs) within the first region of the picture and the first set of CTs may be coded with a merge code. Additionally, at step 602, the value of the first number M is set to be A, and at step 604, the value of the second number N is set to be B.

Figure 8:
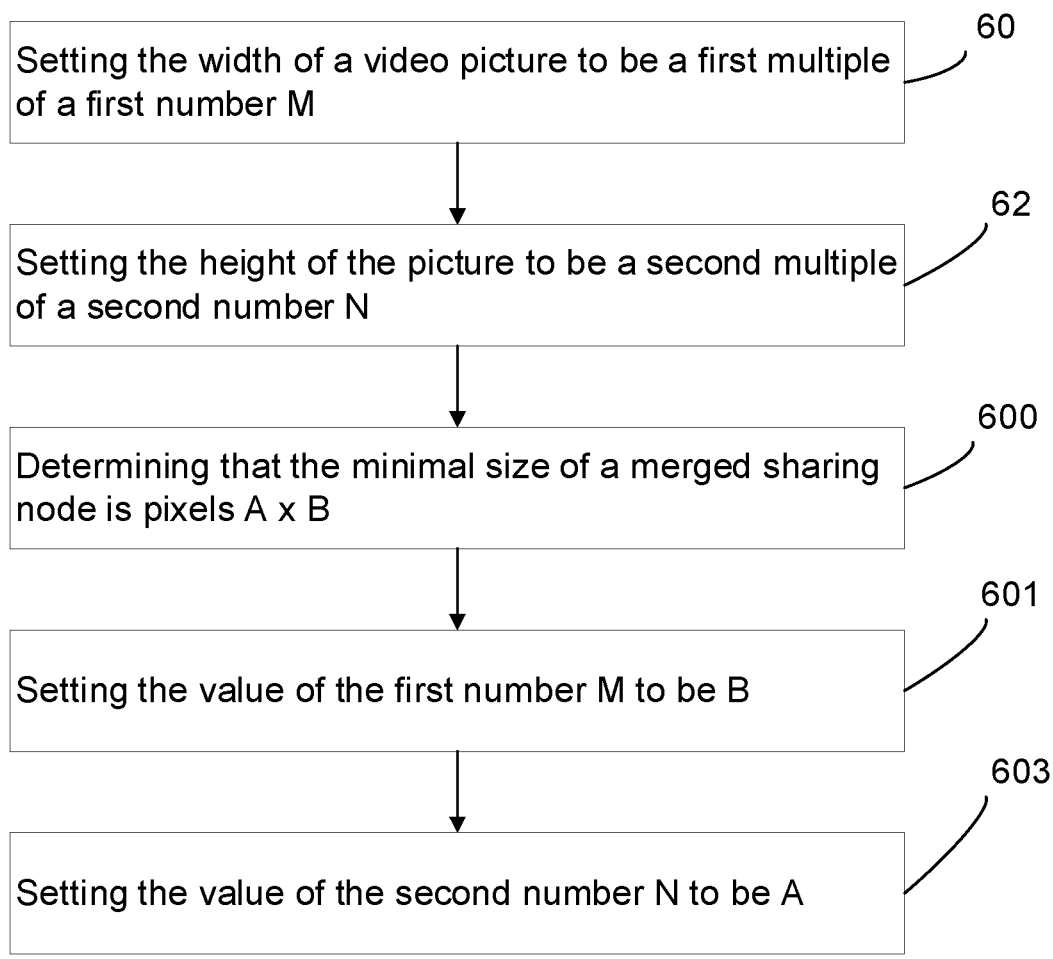
FIG. 8 is a flowchart illustrating another exemplary operation of a video coder.

FIG. 8 is a flowchart illustrating another exemplary operation of a video coder, such as video encoder 100 shown in the example of FIG. 1 and/or video decoder 200 shown in the example of FIG. 2. In addition to steps 60 and 62, at step 600, it is then determined that the minimum size of a merged sharing node is A×B pixels, wherein A and B are positive integers. The merge sharing node may be corresponding to a first region of the picture. There may be a first set of coding units (CTs) within the first region of the picture and the first set of CTs may be coded with a merge code. Additionally, at step 601, the value of the first number M is set to be B, and at step 603, the value of the second number N is set to be A.

Figure 9:
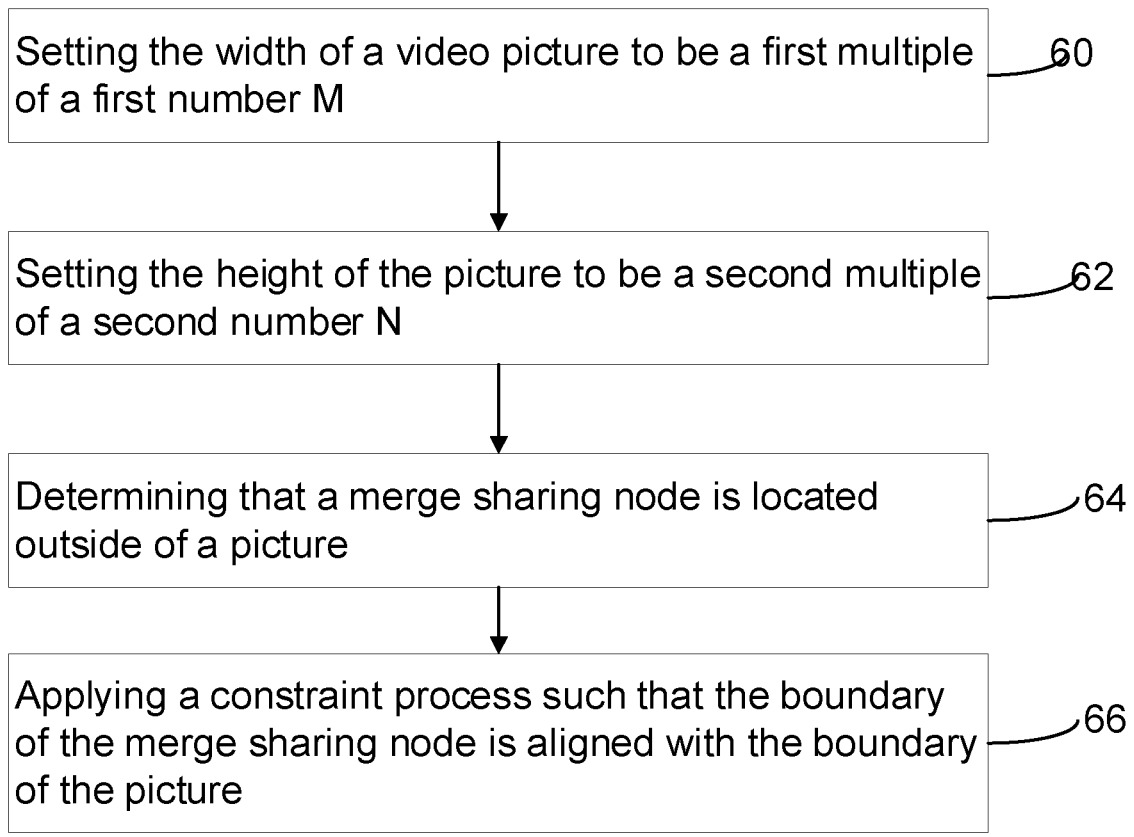
FIG. 9 is a flowchart illustrating another exemplary operation of a video coder.

FIG. 9 is a flowchart illustrating another exemplary operation of a video coder, such as video encoder 100 shown in the example of FIG. 1 and/or video decoder 200 shown in the example of FIG. 2. At step 60, the width of the picture is set to be a first multiple of a first number M, and at step 62, the height of the picture is set to be a second multiple of a second number N. The first number M and the second number N are positive integer. The two numbers may be identical or different than each other. The first number M and the second number N are predetermined numbers. At step 64, it is then determined that a merge sharing node is located outside of a picture. The merge sharing node is corresponding to a first region of the picture, a first set of coding units of the picture are within the first region, and the first set of coding units are coded with a merge mode. And then at step 66, a constraint process is applied such that the boundary of the merge sharing node is aligned with the boundary of the picture.

In some examples, instead of putting additional constraint on picture sizes, a checking process is applied in generating the shared merge list to guarantee that the region of the merge sharing node is located within the picture. For example, it is checked whether the right and bottom boundary of a merge sharing node is aligned with the picture boundary. If the boundary of the merge sharing node is located outside the picture, a truncation process is applied to force the boundary of the merge sharing node to be aligned with the picture boundary.

Figure 10:
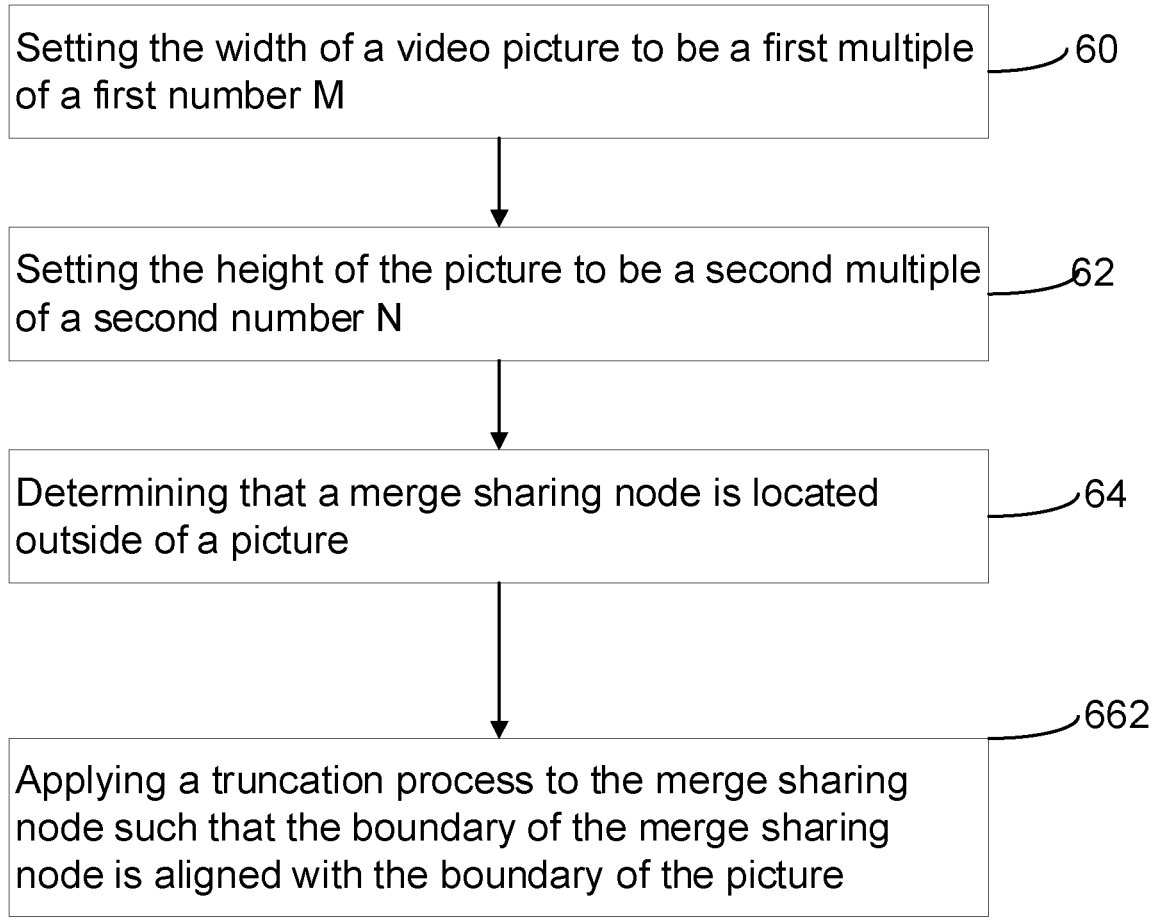
FIG. 10 is a flowchart illustrating another exemplary operation of a video coder.

FIG. 10 is a flowchart illustrating another exemplary operation of a video coder, such as video encoder 100 shown in the example of FIG. 1 and/or video decoder 200 shown in the example of FIG. 2. At step 60, the width of the picture is set to be a first multiple of a first number M, and at step 62, the height of the picture is set to be a second multiple of a second number N. The first number M and the second number N are positive integer. The two numbers may be identical or different than each other. The first number M and the second number N are predetermined numbers. At step 64, it is then determined that a merge sharing node is located outside of a picture. The merge sharing node is corresponding to a first region of the picture, a first set of coding units of the picture are within the first region, and the first set of coding units are coded with a merge mode. And then step 66 may comprise step 662, that is, a truncation process is applied to the merge sharing node such that the boundary of the merge sharing node is aligned with the boundary of the picture.

In some examples, if the boundary of the merge sharing node is located outside the picture, CUs inside the merge sharing node are forced to use other prediction modes instead of merge or skip modes, etc., so that there is no need of a merging candidate list for those CUs. In one example, these CUs may be forced to use intra prediction mode.

Figure 11:
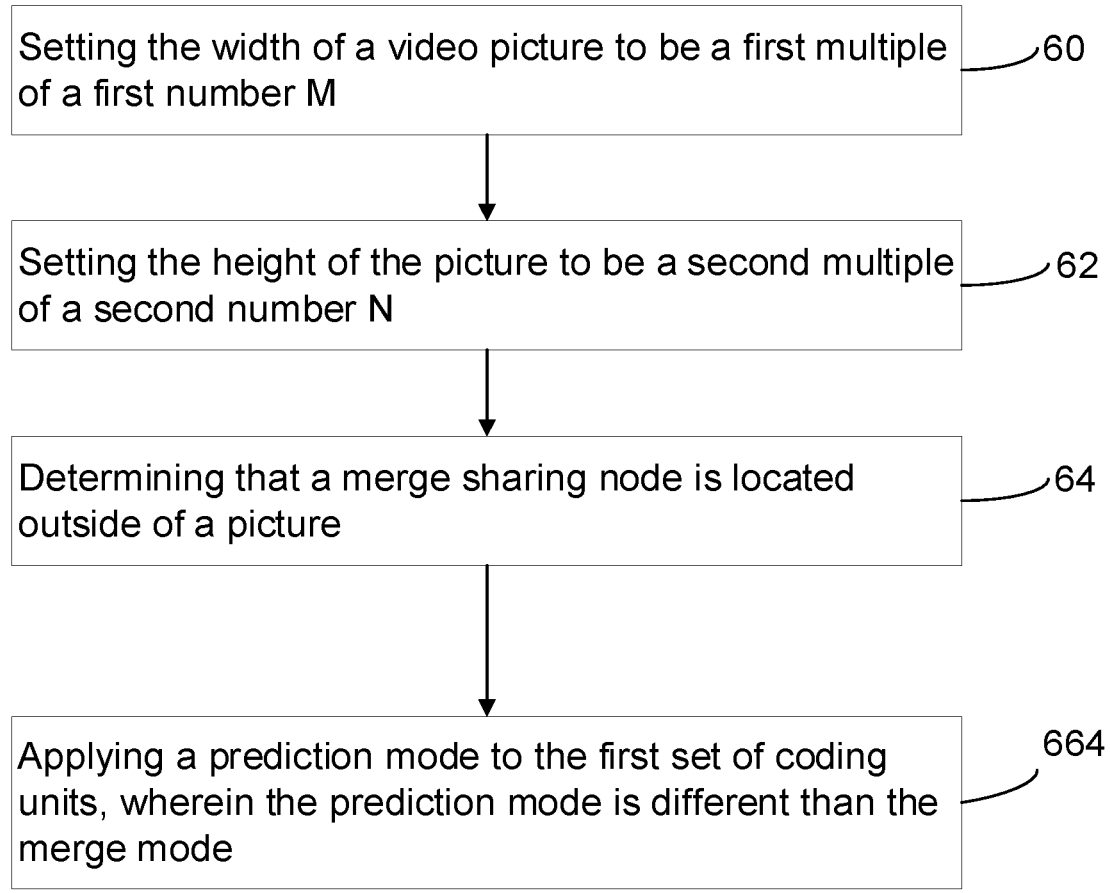
FIG. 11 is a flowchart illustrating another exemplary operation of a video coder.

FIG. 11 is a flowchart illustrating another exemplary operation of a video coder, such as video encoder 100 shown in the example of FIG. 1 and/or video decoder 200 shown in the example of FIG. 2. In addition to step 60, step 62, and step 64, the step 66 may comprise step 664, that is, a prediction mode is applied to the first set of coding units, and the prediction mode is different than the merge mode.

In some examples, a video coding method may comprise the following steps: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

In some examples, the value of the first number M may be identical to the value of the second number N, or may be different than the value of the second number N.

In some examples, the video coding method may further comprise: determining that a merge sharing node is located outside of the picture, wherein the merge sharing node is corresponding to a first region of the picture, a first set of coding units of the picture are within the first region, and the first set of coding units are coded with a merge mode; and applying a constraint process such that the boundary of the merge sharing node is aligned with the boundary of the picture.

In some examples, the step of applying the constraint process such that the boundary of the merge sharing node is aligned with the boundary of the picture comprises: applying a truncation process to the merge sharing node such that the boundary of the merge sharing node is aligned with the boundary of the picture.

In some examples, the step of applying the constraint process such that the boundary of the merge sharing node is aligned with the boundary of the picture comprises: applying a prediction mode to the first set of coding units, wherein the prediction mode is different than the merge mode. In another example, the prediction mode may be an intra prediction mode.

In some examples, the video coding method may further comprise the following steps: determining that the minimum size of a merged sharing node is A×B pixels, wherein A and B are positive integers, the merge sharing node is corresponding to a first region of the picture, a first set of coding units of the picture are within the first region, and the first set of coding units are coded with a merge mode; setting the value of the first number M to be A; and setting the value of the second number N to be B.

In some examples, the video coding method may further comprise the following steps: determining that the minimum size of the merged sharing node is A×B pixels, wherein A and B are positive integers; setting the value of the first number M to be B; and setting the value of the second number N to be A.

In some examples, the value of the first number M is 4 and the value of the second number N is 8, or the value of the first number M is 8 and the value of the second number N is 4, or the value of the first number M is 8 and the value of the second number N is 8.

In some examples, a computer device comprises one or more processors, a non-transitory storage coupled to the one or more processors; and a plurality of programs stored in the non-transitory storage that, when executed by the one or more processors, cause the computing device to perform acts comprising: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

In some examples, a non-transitory computer readable storage medium stores a plurality of programs for execution by a computing device having one or more processors, wherein the plurality of programs, when executed by the one or more processors, cause the computing device to perform acts comprising: setting the width of a video picture to be a first multiple of a first number M, wherein the first number M is a positive integer; and setting the height of the picture to be a second multiple of a second number N, wherein the second number N is a positive integer, and the first number M and the second number N are predetermined.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:
1. A video coding method, comprising:
setting a width of a video picture to be a first multiple of a first number M, wherein the first number M is a positive integer;
setting a height of the picture to be a second multiple of a second number N, wherein the second number N is a positive integer, and the first number M and the second number N are predetermined;
determining that the minimum size of a merge sharing node is A×B pixels, wherein A and B are positive integers, the merge sharing node is corresponding to a first region of the picture, a first set of coding units of the picture are within the first region, and the first set of coding units are coded with a merge mode; and
setting the value of the first number M to be one of A and B and setting the value of the second number N to be the other one of A and B such that no boundary of the merge sharing node is located outside the picture.

2. The method of claim 1, wherein the value of the first number M is identical to the value of the second number N, or
wherein the value of the first number M is different from the value of the second number N.

3. The method of claim 1, wherein the value of the first number M is 4 and the value of the second number N is 8.

4. The method of claim 1, wherein the value of the first number M is 8 and the value of the second number N is 4.

5. The method of claim 1, wherein the value of the first number M is 8 and the value of the second number N is 8.

6. A computing device, comprising:
one or more processors;
a non-transitory storage coupled to the one or more processors; and
a plurality of programs stored in the non-transitory storage that, when executed by the one or more processors, cause the computing device to perform acts comprising:

setting a width of a video picture to be a first multiple of a first number M, wherein the first number M is a positive integer;
setting a height of the picture to be a second multiple of a second number N, wherein the second number N is a positive integer, and the first number M and the second number N are predetermined;
determining that the minimum size of a merge sharing node is A×B pixels, wherein A and B are positive integers, the merge sharing node is corresponding to a first region of the picture, a first set of coding units of the picture are within the first region, and the first set of coding units are coded with a merge mode; and
setting the value of the first number M to be one of A and B and setting the value of the second number N to be the other one of A and B such that no boundary of the merge sharing node is located outside the picture.

7. A non-transitory computer readable storage medium storing a plurality of programs for execution by a computing device having one or more processors, wherein the plurality of programs, when executed by the one or more processors, cause the computing device to perform acts comprising:
setting a width of a video picture to be a first multiple of a first number M, wherein the first number M is a positive integer;
setting a height of the picture to be a second multiple of a second number N, wherein the second number N is a positive integer, and the first number M and the second number N are predetermined;
determining that the minimum size of a merge sharing node is A×B pixels, wherein A and B are positive integers, the merge sharing node is corresponding to a first region of the picture, a first set of coding units of the picture are within the first region, and the first set of coding units are coded with a merge mode; and
setting the value of the first number M to be one of A and B and setting the value of the second number N to be the other one of A and B such that no boundary of the merge sharing node is located outside the picture.

* * * * *